Aug. 13, 1946.　　　　W. F. ROSS　　　　2,405,609
FORM TOOL CHIP BREAKER GENERATING FIXTURE
Filed Aug. 17, 1944　　　　2 Sheets-Sheet 1
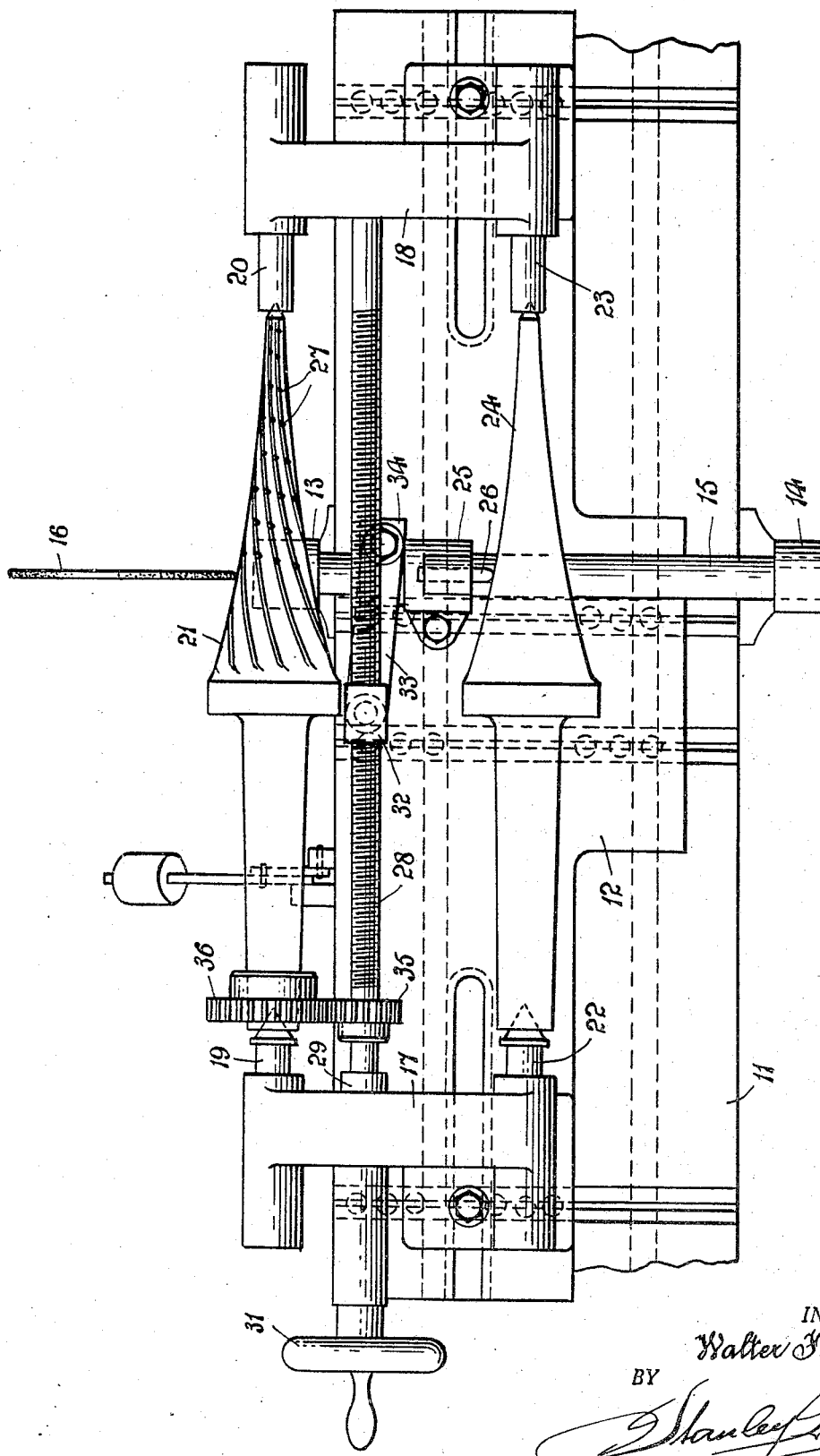
Fig. 1.
INVENTOR.
Walter F. Ross.
BY

Aug. 13, 1946.   W. F. ROSS   2,405,609
FORM TOOL CHIP BREAKER GENERATING FIXTURE
Filed Aug. 17, 1944   2 Sheets-Sheet 2
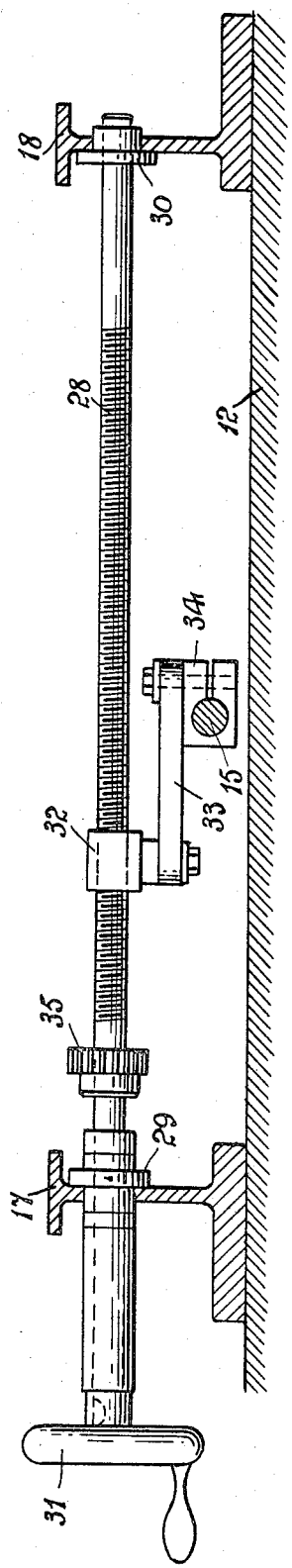
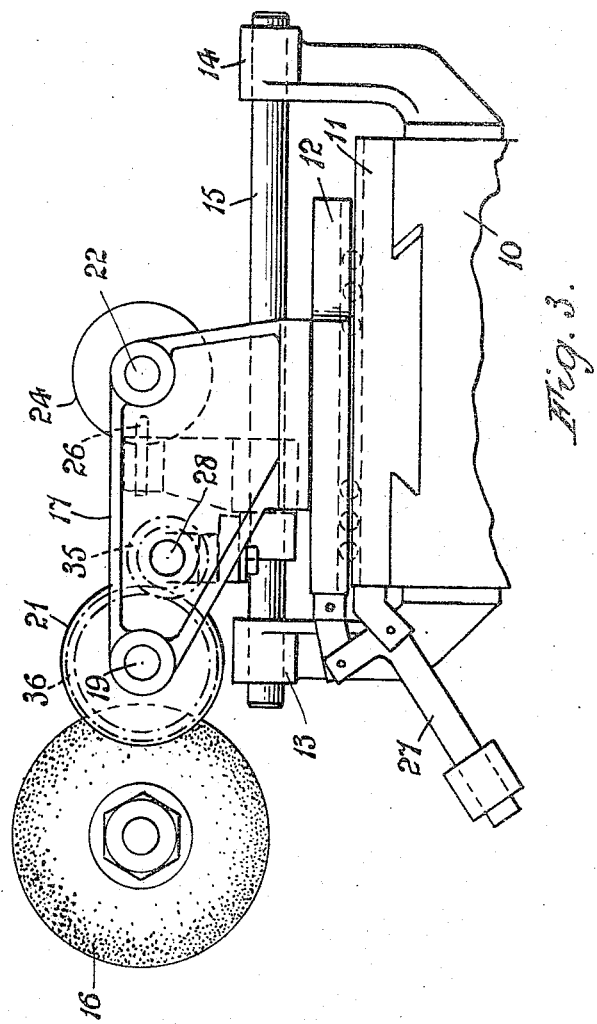
INVENTOR.
Walter F. Ross.
BY
Stanley Lightfoot Patented Aug. 13, 1946

2,405,609

UNITED STATES PATENT OFFICE 2,405,609

FORM TOOL CHIP BREAKER GENERATING FIXTURE

Walter F. Ross, Detroit, Mich., assignor to Motor Tool Manufacturing Company, Detroit, Mich., a corporation of Michigan Application August 17, 1944, Serial No. 549,891

2 Claims. (Cl. 51—100)

1

This invention relates to mechanism for the grinding of chip breaker interruptions in the cutting teeth of rotary form tools, and similar tools having profiled outlines of varying diameter throughout the length thereof, and has for its object to provide an arrangement which is readily adaptable to produce this operation quickly and accurately on different shapes and sizes of tools without calling for tedious and critical setting up of the work.

A still further object is to provide such a mechanism of simple and easily constructed form which may be readily attached as a fixture to an existing grinding machine.

A still further object is to provide in such mechanism for the simple coupling of the work to a follower finger, co-acting with a dummy or profiled stop defining the envelope of the work, in such manner that the rotation of the work will be accompanied by the traverse of the follower finger over a line defining the contour of the dummy and such traverse translated into movement of the work relative to the grinding wheel along such defined path.

Still further objects or advantages additional or subsidiary to the aforesaid objects, or resulting from the construction or operation of the invention as it may be carried into effect, will become apparent as the said invention is hereinafter further disclosed.

In carrying the said invention into effect, I may provide a transversely slidable table mounted on a longitudinal movable table which in turn is mounted on a fixed supporting structure, said transversely slidable table carrying a fixture, which includes a pair of work carrying centers and a pair of dummy carrying centers arranged in parallel relation to said work carrying centers; a follower finger having longitudinal line contact with said dummy and carried by a rider bar supported by said fixed structure, means biasing said transversely slidable table to maintain said dummy in contact with said follower finger during longitudinal movements of said correspondingly movable table; a hand operated lead screw linked to said fixed follower finger, whereby the longitudinal movement of the dummy may be effected, and means transmitting rotary motion of said feed screw to the work, whereby the said work may be rotated in contact with a grinding wheel as the said work is simultaneously moved longitudinally through a path defined by the line contact of the said follower finger with the profiled dummy. All of which is more particularly described and ascertained hereinafter, by way of example, having reference to the accompanying drawings, wherein:

Figure 1 is a plan of a fixture embodying the said invention;

Figure 2 is a longitudinal vertical section taken on plane indicated by the line 2—2 in Figure 1; and Figure 3 is an end elevation of the device.

Similar characters of reference indicate similar parts in the several figures of the drawings.

10 indicates the base structure of a grinding machine on which the longitudinal movable table 11 is mounted, which table 11 in turn carries the transversely slidable table 12. The base structure 10 is provided with upwardly extending arms 13 and 14 supporting a rider bar 15 which extends across and above the transversely sliding table 12. 16 represents a grinding wheel which is supported and driven in any well known manner (not shown) and with respect to which the said table 12 is longitudinally movable together with the table 11 and transversely movable upon the said table 11.

17 and 18 are tailstocks mounted on the said table 12, 19 and 20 being centers mounted in the said tailstocks to receive the work 21 therebetween, and 22 and 23 are similar centers carried by the said tailstocks in parallel relation to the said centers 19 and 20 to receive a dummy 24 having a profile which is that of the envelope of the cutting surface of the work 21 to be operated on by the grinding wheel, said dummy 24 acting as a profiled stop for the transversely slidable table 12 as will be further explained.

The rider bar 15 is provided with a normally fixed but adjustable bracket 25 carrying a follower finger 26 which finger is intended to impinge against the profiled surface of the dummy or stop 24 under the influence of a weighted lever 27 linked to the back of the said transversely slidable table 12 and thus biasing the said table 12 in the direction of the grinding wheel. This lever 27 will also operate as a handle, by the manual raising of which the said table 12 may be moved away from the grinding wheel. It will be obvious that such movements of the table accompany corresponding lateral movement of the dummy or stop 24 relative to the fixed follower finger 26, and it will also be obvious that, if the said table 12 on its table 11 be moved longitudinally so that the profiled dummy or stop 24 is traversed relatively by the follower finger 26, the said table will be caused to recede from the grinding wheel as the diameter of the stop 24 increases. This, longitudinal movement of the said table 12 and its dummy or its stop 24 relative to the said follower finger 26 will be accompanied by the lateral sliding of the said table 12 in accordance with variations in diameter of the said stop 24 and these movements will produce a resultant path of travel which is that of the contour of the line on the said stop 24 traversed by the follower finger 26. This path of travel is of course transmitted to the work 21 as the said work is mounted on the same table.

To effect the foregoing controlled movement of the work relative to the grinding wheel, and also the synchronized rotation of the work in order that the said grinding wheel may pass over a helical path about the envelope of the work and thereby notch the teeth thereof at spaced intervals as indicated at 27, I provide a hand operated feed screw 28 which is shown as being mounted in bearings 29 and 30 carried by the tailstocks 17 and 18 respectively. This feed screw is provided with a hand wheel 31 for its manual operation and is threaded through a lead screw follower 32 which in turn is connected by the swingable link 33 and link pivot clamp 34 to the fixed rider bar 15.

By reason of the linkage referred to rotation of the feed screw 28 in one or other direction will naturally result in the longitudinal movement of the table 12 with its supporting table 11, and this movement will in turn result in the sliding table 12 moving transversely of the table 11 by virtue of the action of a profiled stop 24 on the follower finger 26 as previously described.

To effect rotation of the work while this movement of the table is being effected I provide interchangeable gears 35 and 36 removably mounted on the shaft of the feed screw 28 and the shank of the work 21, and so proportioned that the speed of rotation of the work in relation to the longitudinal movement in front of the grinding wheel will produce the desired helical path of the grinding wheel on the envelope surface of the work and thereby enable the said grinding wheel to produce the spaced chip breaker notches in the teeth of the work as clearly indicated in Figure 1 of the drawings.

The provision of chip breaker interruptions in the teeth of rotary form and similar tools is, of course, not new in itself, it having been a quite common practice to do this, and the present invention lies in the simple expedients adopted by which the grinding of such interruptions may be simply and effectively accomplished on a form tool of varying profile such, for example, as that illustrated in the drawings; and a further important feature of the invention resides in the use, in the manner described, of a cylindrical dummy, any surface of which presented to the follower finger will provide a line of contact of the required profile so that the setting up of the work for the chip breaker grinding is of the very simplest nature, the work and its corresponding cylindrical dummy being simply slipped into position between their respective centers and the follower finger and the wheel adjusted into required contact with the surface of the dummy or stop and the tooth of the work.

This invention may be developed within the scope of the following claims without departing from the essential features of the said invention, and it is desired that the specification and drawings be read as being merely illustrative of a practical embodiment of the said invention and not in a strictly limiting sense.

What I claim is:

1. In a device of the class described, in combination, a fixture table having longitudinally and transversely guided support a pair of work-holding centers mounted on said table, a second pair of centers also mounted on said table in parallel with said work-holding centers, a profiled stop carried by said second pair of centers, a fixed follower finger, means biasing said table to urge said stop against said finger, a feed screw carried by said table, a feed nut on said screw linked to said follower finger for moving said table longitudinally and to cause said stop to also move said table transversely by virtue of the riding of said stop over said finger, means transmitting rotary motion of said feed screw to the work during such combined movements, and a grinding wheel positioned to cutting interruptions in the teeth of said work during the resulting lineal and rotary movements thereof.

2. In a device of the class described, in combination, a fixture table having longitudinally and transversely guided support a pair of work-holding centers mounted on said table, a second pair of centers also mounted on said table in parallel with said work-holding centers, a profiled stop carried by said second pair of centers, a fixed follower finger, means biasing said table to urge said stop against said finger, a feed screw carried by said table, a feed nut on said screw linked to said follower finger for moving said table longitudinally and to cause said stop to also move said table transversely by virtue of the riding of said stop over said finger, interchangeable gears transmitting rotary motion of said feed screw to the work during such combined movements, and a grinding wheel positioned to cutting interruptions in the teeth of said work during the resulting lineal and rotary movements thereof.

WALTER F. ROSS.